United States Patent [19]

Collins et al.

[11] Patent Number: 4,951,808

[45] Date of Patent: Aug. 28, 1990

[54] ACCUMULATING CONVEYOR

[75] Inventors: Ellsworth H. Collins, Shepherdsville; James F. Mattingly; David B. Reed, both of Louisville, all of Ky.

[73] Assignee: The Interlake Companies, Inc., Shepherdsville, Ky.

[21] Appl. No.: 461,008

[22] Filed: Jan. 4, 1990

[51] Int. Cl.$^5$ .............................................. B65G 13/06
[52] U.S. Cl. ..................................... 198/781; 198/791
[58] Field of Search ................ 198/780, 781, 789, 791

[56] References Cited

U.S. PATENT DOCUMENTS

| | | | |
|---|---|---|---|
| 1,735,767 | 11/1929 | Keller et al. | 198/791 |
| 2,748,919 | 6/1956 | Britton et al. | 198/791 |
| 3,404,658 | 10/1968 | French et al. | |
| 3,561,622 | 2/1971 | Dioguardi | |
| 3,561,625 | 2/1971 | Dioguardi | |
| 3,667,589 | 6/1972 | Constable | |
| 3,729,088 | 4/1973 | Stein et al. | 198/781 |
| 3,960,262 | 6/1976 | Henig | |
| 3,967,718 | 7/1976 | Monahan | |
| 4,090,603 | 5/1978 | Marklund | |
| 4,193,492 | 3/1980 | Hammond | 198/781 |
| 4,266,660 | 5/1981 | Herman | 198/791 X |
| 4,291,796 | 9/1981 | Gebhardt | |
| 4,640,408 | 2/1987 | Eaves | |
| 4,733,772 | 3/1988 | Potter | 198/781 |
| 4,792,034 | 12/1988 | Leemkuil | |

FOREIGN PATENT DOCUMENTS

| | | | |
|---|---|---|---|
| 0190506 | 8/1986 | European Pat. Off. | 198/781 |
| 3426598 | 2/1985 | Fed. Rep. of Germany | 198/791 |
| 3401634 | 7/1985 | Fed. Rep. of Germany | 198/791 |
| 0254405 | 11/1986 | Japan | 198/781 |
| 2078184 | 1/1982 | United Kingdom | 198/781 |

Primary Examiner—H. Grant Skaggs
Assistant Examiner—James R. Bidwell
Attorney, Agent, or Firm—Theresa Fritz Camoriano

[57] ABSTRACT

An accumulating conveyor is driven by a single, long drive shaft and a plurality of clutch shafts driven off of the drive shaft.

7 Claims, 2 Drawing Sheets

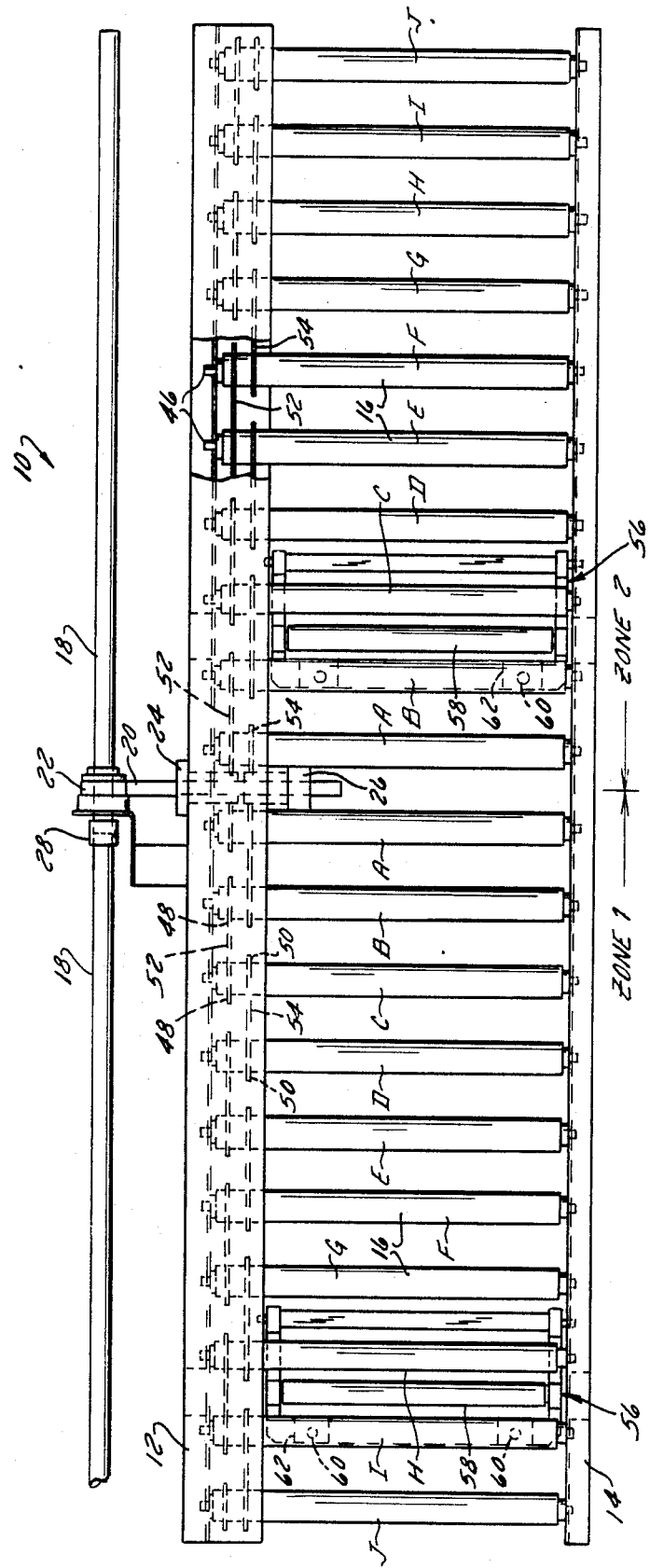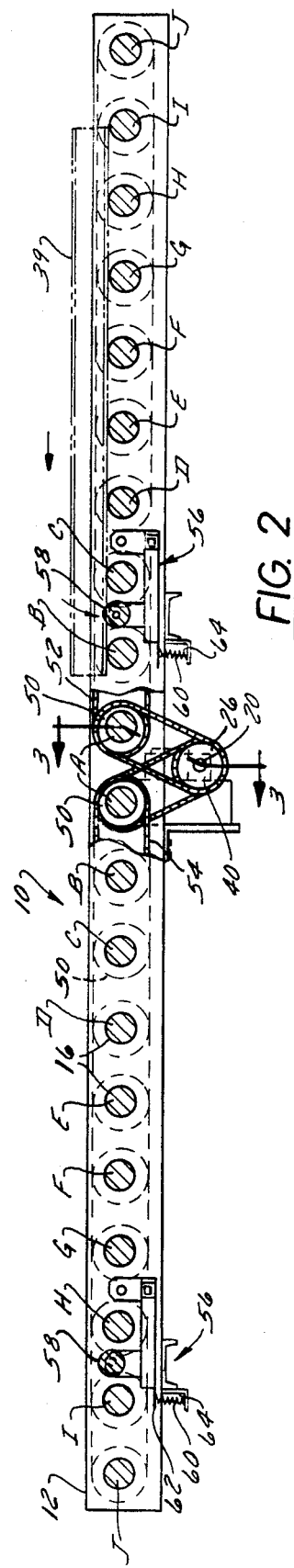
FIG. 1
FIG. 2

ACCUMULATING CONVEYOR

BACKGROUND OF THE INVENTION

The present invention pertains to accumulating conveyors, and, in particular, to an accumulating conveyor intended for heavy duty use, as for conveying pallets.

Accumulating conveyors are known in the art. They provide more control over the flow of material than normal conveyors. Accumulating conveyors are typically divided into zones of belts or rollers and include some type of control means whereby zones are driven or remain idle depending upon the location of articles on the conveyor. In a standard conveyor in which the whole conveyor is driven at a fixed rate, if there is a back-up in the system, the articles begin to bump into each other, creating line pressure, jarring and perhaps damaging each other. In an accumulating conveyor, if there is a back-up in the system, the control system will cause some of the zones to stop driving, creating a "holding pattern" to prevent the articles on the conveyor from bumping into each other. Then, when the back-up is relieved, the zones begin driving again, permitting the articles to flow along the conveyor.

There are several problems with the heavy duty accumulation conveyors that existed prior to the present invention. Pallet accumulation conveyors typically are driven by long strands of chain. They are very noisy and very difficult and expensive to maintain It is a constant struggle to keep the long chains properly tensioned. There are also large power losses in these conveyors, thus wasting energy and limiting the length of conveyor that can be driven with a single drive. Additional drive units must be used in order to drive a long conveyor, and the drive units must be synchronized in some manner to maintain a steady flow of material. This causes considerable additional expense. The noise, waste of energy, difficulty and expense of maintenance, and limitation in length of the conveyor are all serious problems in prior art conveyors.

SUMMARY OF THE INVENTION

The present invention solves many of the problems of heavy duty accumulation conveyors of the prior art. The present invention eliminates the long strands of drive chain which caused the noise, maintenance problems, and inefficiencies in power transmission in the prior art. It uses instead a long drive shaft running the entire length of the conveyor. The resulting conveyor is not noisy, does not require much maintenance, is more energy efficient, and can carry more power than a chain.

Clutch shafts are located at regular intervals along the conveyor and take their power from the drive shaft through a gear type of power take-off. This means that power is transmitted quietly and efficiently to each zone. Very little maintenance is required for this conveyor. After the first installation and break-in period, no further adjustment is needed in any part of the transmission chain. Also, all components are easily accessible.

In addition, the present invention makes all these improvements while using as many standard conveyor components as possible to keep costs down. The present invention uses the same rollers, sprockets, and chain connections between rollers as do prior art conveyors.

In the present invention, on each clutch shaft are mounted two clutches, each clutch driving its own respective zone of conveyor rollers. The use of a single clutch shaft to drive two clutches and two zones provides an economical and simple system, as only one power take-off is needed to drive two zones. Again, this reduces the cost of the system, reduces the number of parts to be maintained, and reduces the number of places for power to be lost.

This improved accumulation conveyor is quiet, easy to maintain, and, due to the larger torque capacity of the power shaft and the high efficiency power transfer, this design can provide a longer accumulation conveyor per drive unit than any other known design.

Unlike many prior art conveyors, in the present invention there is no loss of efficiency from zone to zone, because each zone is driven independently of the other zones.

This permits the present accumulation conveyor to be made with better performance and at lower cost.

The present conveyor also includes clutch brakes so that, when the clutch is not engaged, it is braked, thereby preventing the rollers from idling, and preventing the momentum of a product from carrying it beyond the zone in which it should stop.

BRIEF DESCRIPTION OF THE DRAWINGS

FIG. 1 is a top view partially in section of the accumulating conveyor of the present invention, with one end broken away;

FIG. 2 is a side sectional view partially broken away of the accumulating conveyor of FIG. 1, with a pallet shown in phantom;

DESCRIPTION OF THE PREFERRED EMBODIMENT

Figure 3:
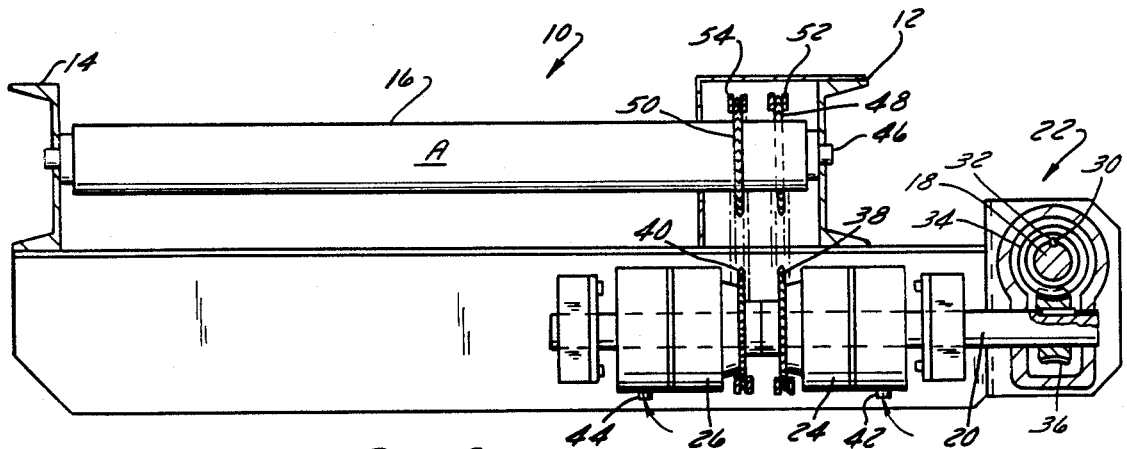
FIG. 3 is a sectional view taken through the gear drive 22 of FIG. 1.

The conveyor 10 includes a standard conveyor frame having two side rails 12, 14 and a plurality of rollers 16 rotatably mounted on the frame. The rollers 16 are mounted across the width of the conveyor 10. A drive shaft 18, which is connected to a drive means (not shown) runs the entire length of the conveyor 10. At 10 foot intervals along the length of the conveyor, the drive shaft 18 passes through a power takeoff 22. A clutch shaft 20 extends at a substantially perpendicular angle to the drive shaft 18 and is driven by the power takeoff 22. The preferred type of power takeoff 22 is a right angle gear drive supplied by Tol-o-matic, Inc.

The drive shaft 18 is made in ten-foot sections which are coupled together by standard couplings 28. The end of each section of the shaft 18 which passes through the power take-off has a keyway 30 machined into it extending about one foot in from the end. The keyway 30 can be seen in FIG. 3. The keyway 30 mates with a key 32 in the power take-off 22. The clutch shaft 20 also has a keyway 33 which mates with a key in the power take-off 22. The Tol-0-Matic brand right angle gear drive, which is the preferred power take-off 22, has 45° helical gears 34, 36 mounted around the drive shaft 18 and the clutch shaft 20, respectively.

Two clutches 24, 26 are mounted on each clutch shaft 20. Only a single clutch shaft 20 is shown in these drawings, but it is intended that the conveyor be much longer than this, with a power takeoff 22 and a clutch shaft 20, located at tenfoot intervals along the conveyor.

The clutches 24, 26 have sprockets 38, 40 respectively, which are driven by the clutch shaft 20 when the clutches are engaged. When either of the clutches 24, 26 is disengaged, its respective sprocket 38 or 40 will not rotate. A spring-activated brake in the clutch will stop the sprocket from coasting when the clutch is disengaged. The clutches 24, 26 shown in these drawings are fluid-operated clutches, with fluid ports 42, 44 to receive signals from a fluid controller, but other types of clutches could be used depending upon the type of control system used. In any event, it is preferred that the clutch include a braking feature which prevents it from rotating when it is disengaged.

Figure 6:
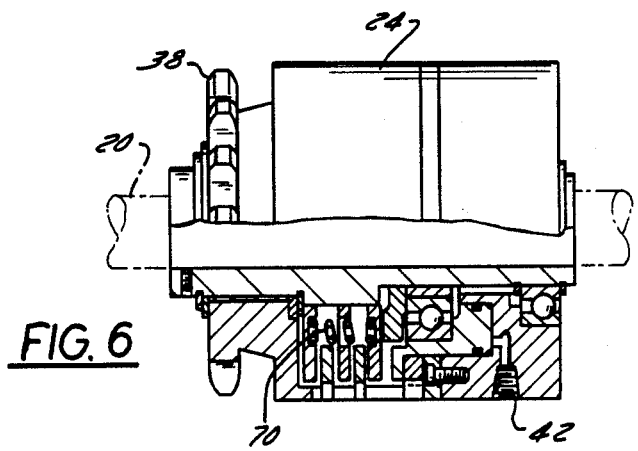
FIG. 6 is a view of one of the clutches of FIG. 3 partially in section.
Figure 4:
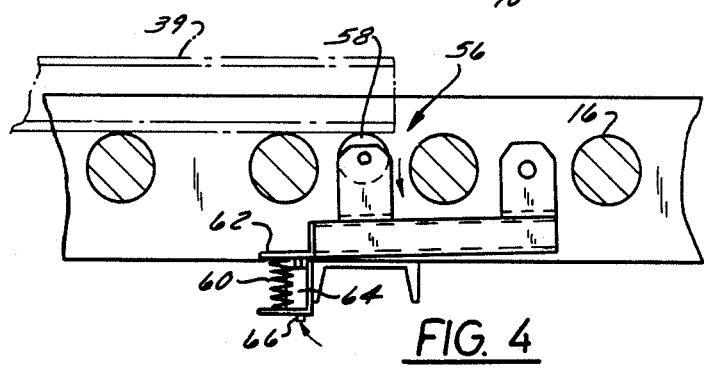
FIG. 4 is an enlarged view of the sensor portion of the conveyor shown in FIG. 2.
Figure 5:
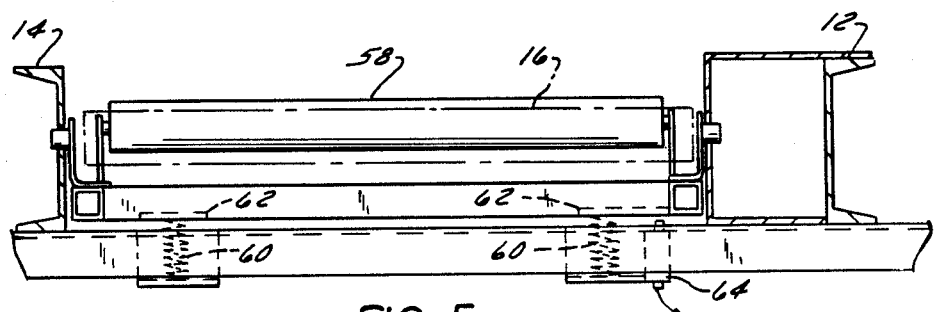
FIG. 5 is a sectional view through the sensor mechanism of FIG. 1.

A clutch 24 is shown partially in section in FIG. 6. The preferred clutch when fluid pressure is used for the controls is made by Mach III Incorporated of Ludlow, Kentucky, Model No. AST-44CB. This clutch has a port 42 which receives fluid pressure from the controller.

As shown in FIG. 6, the clutch 24 is not engaged, and the spring 70 applies a braking force to the clutch 24 which prevents the clutch sprocket from rotating. Thus, with the clutches of the present invention, the rollers are either driven when the clutch is engaged or braked when the clutch is not engaged. This prevents the rollers from idling and thereby prevents the momentum of objects on the conveyor from carrying them beyond the zone in which they should stop.

Each clutch sprocket 38 or 40 drives a zone of conveyor rollers 16. These drawings show two zones, Zone 1 and Zone 2, but it is intended that there be many zones along the length of the conveyor.

The manner in which the zones of rollers 16 are mounted on the conveyor and driven by the clutches will now be described. As is typical of live roller conveyors, each roller 16 has a roller shaft or axle 46, which is journalled into the two side rails 12, 14 of the conveyor 10. Thus, each roller 16 extends width-wise across the conveyor 10. Mounted on the roller shaft or axle 46 is the cylindrical roller 16. Each roller 16 has first and second sprockets 48, 50 mounted on it. The rollers 16 within a zone are all drivingly connected together by means of chains extending around the sprockets 48 or 50 of adjacent rollers 16. As shown in FIG. 1, each zone of rollers 16 includes ten rollers 16, identified by the letters A through J, with A being closest to the clutch shaft 20 which drives that zone.

Now, referring to Zone 1, the sprocket 38 on the outer clutch 24 and the outer sprocket 48 of the roller 16A are joined by a chain, so when the clutch 24 is engaged, its sprocket 38 rotates, and that rotation is transmitted to the first roller 16A by means of an outer loop of chain 52. The inner sprocket 50 on the first roller 16A is then connected by an inner chain 54 to the inner sprocket 50 on the next adjacent roller 16B. The outer sprocket 48 of the roller 16B is connected to the outer sprocket 48 in the next roller 16C by an outer chain 52 and so forth, with rollers 16 in the zone being drivingly connected to each other by small loops of chain wrapped around the sprockets of adjacent rollers. Thus, when the outer clutch 24 is engaged, it drives the first roller 16A in Zone 1, which drives the next roller 16B, and so forth to the last roller 16J in the zone.

Similarly, in Zone 2, the sprocket 40 on the inner clutch 26 drives the first roller 16A, which drives the second roller 16B through the outer sprockets 48, and so forth to the last roller 16J in the zone.

Each zone has a sensor 56 which senses the presence or absence of a pallet. In the embodiment shown here, the sensor 56 includes a spring-loaded idler roller 58 which is biased upward by the spring 60 so that, in its normal position, the idler roller is slightly above the top surface of the rollers 16. A plate 62 is part of the bracket which supports the idler roller 58. A fluid switch 64 is mounted next to the spring 60 and below the plate 62.

When a pallet 39 moves over the idler roller 58, it pushes the roller 58 downward against the force of the spring 60. The plate 62 contacts the fluid switch 64, which, through a fluid control arrangement (not shown), controls the clutches.

In this case, air pressure is supplied to the fluid switch 64, and an air hose (not shown) is connected from the port 66 on the fluid switch to the port 44 on the inner clutch 26. When the plate 62 is up, meaning that there is no load on the idler roller 58, the air pressure is applied to the clutch, so the clutch is engaged, and drives its zone of rollers.

When the idler roller 58 is pushed down, it contacts the fluid switch 64, opening the port 68, so air pressure exhausts from the clutch 24, disengaging the clutch 24. The spring-loaded brake 72 in the clutch is then engaged, which causes the rollers 16 in Zone 1 to stop.

This control arrangement is intended only as an example. Many other kinds of logic, controls, sensors, and clutches, including photo eye sensors and electronic controls, are known and used in accumulation conveyors and could be used here as well.

The important improvement in the present invention is the way it is driven, which provides a quieter, more efficient, almost maintenance-free conveyor.

What is claimed is:

1. An accumulating conveyor, comprising:
    a conveyor frame having a length and a width;
    a plurality of rollers rotatably mounted widthwise across the conveyor frame, with the rollers grouped into zones, each zone including a plurality of adjacent rollers;
    a drive shaft extending along the length of the conveyor;
    at least one clutch shaft extending at an angle to the drive shaft;
    a gear-driven power take-off located between the drive shaft and the clutch shaft for transmitting power from the drive shaft to the clutch shaft;
    a clutch mounted on the clutch shaft; and
    drive means between the clutch and its respective zone of rollers for driving the rollers in that zone.

2. An accumulating conveyor as recited in claim 1, wherein the drive means between the clutch and its respective zone of rollers comprises:
    a sprocket mounted on the clutch;
    a sprocket mounted on a first roller in the respective zone;
    a chain extending around the clutch sprocket and the first roller sprocket so that rotation of the clutch sprocket causes the chain to be driven which, in turn, drives the first roller sprocket causing the first roller in the zone to be driven; and
    drive means between the first roller in the zone and the other rollers in the zone, so that rotation of the first roller causes the other rollers to rotate.

3. An accumulating conveyor as recited in claim 2, wherein every roller in the respective zone has at least two sprockets, each pair of adjacent rollers in the zone has a chain connecting one sprocket of one of the adjacent rollers to one sprocket of the other adjacent roller, and the first roller is at one end of the zone.

4. An accumulating conveyor as recited in claim 1 or 3, and further comprising a second clutch mounted on the clutch shaft and drive means between the second clutch and the rollers of a second respective zone.

5. An accumulating conveyor, comprising:
a conveyor frame;
a plurality of rollers rotatably mounted widthwise across the conveyor frame with the rollers grouped into zones of adjacent rollers;
a drive shaft running along the length of the conveyor frame;
a clutch shaft at an angle to the drive shaft;
power take-off means located between the drive shaft and the clutch shaft for transmitting power between the drive shaft and the clutch shaft;
first and second clutches mounted on the clutch shaft; and
drive means between each clutch and its respective zone of rollers.

6. An accumulating conveyor as recited in claim 5, and further comprising a plurality of sensors, one sensor located in each zone; and a clutch control means communicating with the sensors such that each sensor senses the presence of a product in its respective zone, and each clutch is either engaged or disengaged by the clutch control means to control the flow of products along the conveyor.

7. An accumulating conveyor as recited in claim 6, wherein each clutch includes a spring-biased brake so that, when the clutch is disengaged, the brake is engaged.

* * * * *